Jan. 26, 1960

H. W. FATKIN ET AL 2,922,225

SURVEYING INSTRUMENTS

Filed May 16, 1956

INVENTOR
HARRY W. FATKIN
RALPH W. OBERHOLTZER
BY

ATTORNEY.

Jan. 26, 1960
H. W. FATKIN ET AL
2,922,225
SURVEYING INSTRUMENTS
Filed May 16, 1956
2 Sheets-Sheet 2
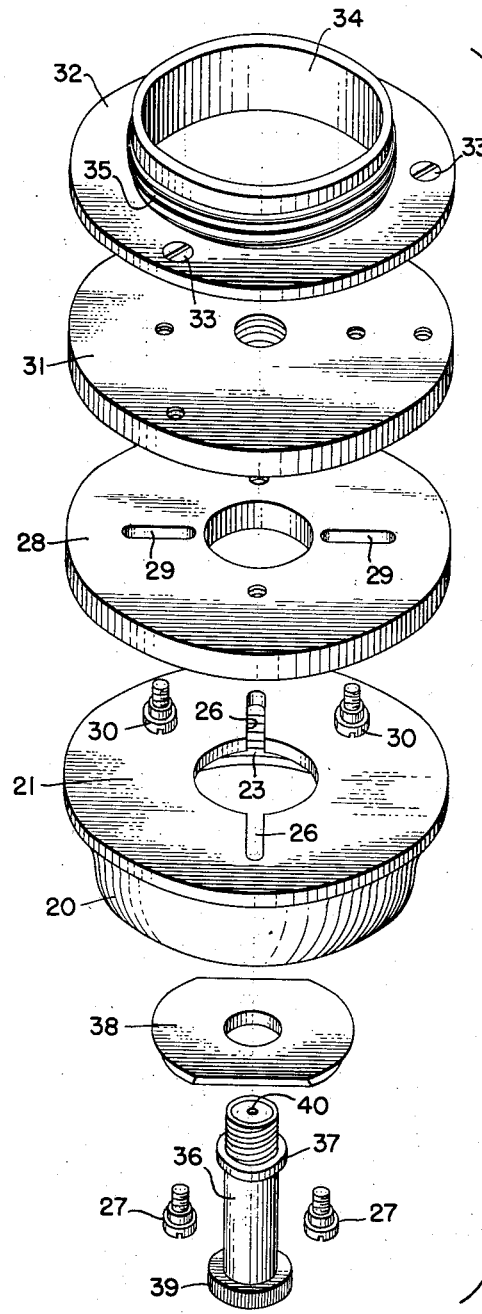
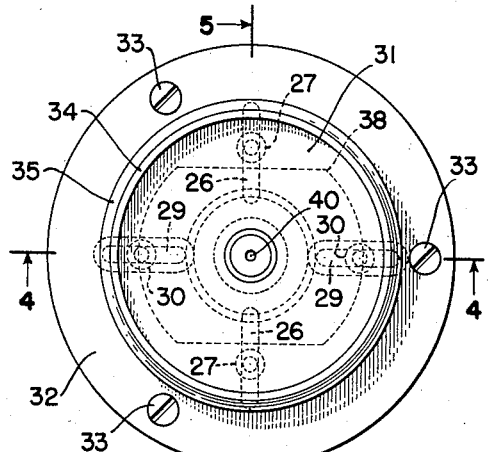
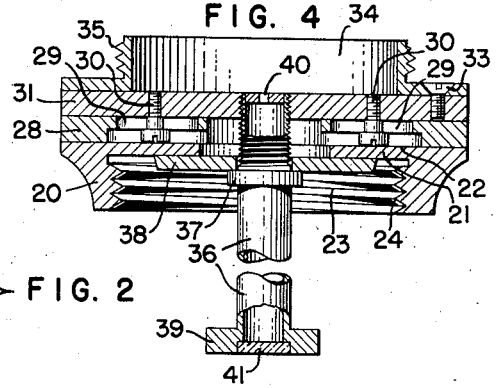
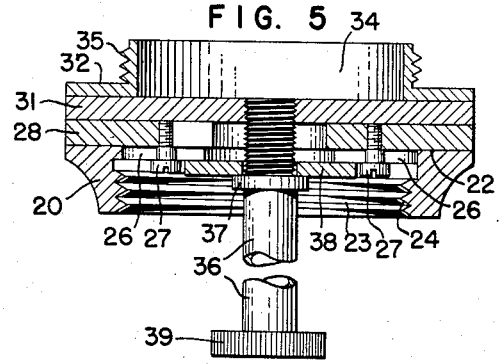
INVENTORS.
HARRY W. FATKIN
RALPH W. OBERHOLTZER
BY
Jas. C. Hebenswith
ATTORNEY.

United States Patent Office 2,922,225
Patented Jan. 26, 1960

2,922,225

SURVEYING INSTRUMENTS

Harry W. Fatkin, Westville, N.J., and Ralph W. Oberholtzer, Upper Moreland Township, Montgomery County, Pa., assignors to Warren-Knight Company, Philadelphia, Pa., a corporation of Pennsylvania Application May 16, 1956, Serial No. 585,364

5 Claims. (Cl. 33—46)

This invention relates to surveying instruments, and particularly those of the transit type.

Heretofore, transits and the like used by engineers and surveyors have been detachably mounted on tripods, the instrument proper being provided with a base plate ordinarily engaged by the lower end faces of two pairs of leveling screws disposed in vertical planes at right angles to each other. The base plate of the instrument is ordinarily and usually detachably mounted on the top plate of the tripod, being in screw threaded engagement therewith, whereby the instrument may be removed from the tripod for placing the same in a suitable case when not in use.

In the use of such instruments, it is necessary at times to shift the instrument horizontally, whereby the axial center of the instrument may be disposed vertically over a fixed point about which measurements are to be taken. For this purpose, the instrument proper is ordinarily constructed so as to be shiftable horizontally with respect to the base plate of the instrument, but when this is done, a slight slackening of the adjusting screws is necessary, and the adjusting screws must slide over the top surface of the base plate, whereby considerable shifting about and readjustment of the leveling screws becomes necessary, particularly if the top surface of the base plate of the instrument is not initially located in a true horizontal plane.

Furthermore, the amount of horizontal shifting permitted in such instruments as ordinarily constructed is quite limited, so that sometimes it is necessary to reset the tripod legs in order to bring the vertical axis of the instrument vertically over the point about which measurements are to be made by means of the instrument.

The principal object of the present invention is to provide an attachment for surveying instruments of the transit type, which attachment may be interposed between the instrument base and the head of the tripod whereby sidewise shifting of the instrument may be more readily accomplished, and this without disturbing the leveling screws.

A further object of the invention is to provide an attachment of the character aforesaid by means of which the instrument proper may be horizontally shifted to a greater extent than is possible with instruments of the ordinary type for the purpose of bringing the vertical axis of the instrument in vertical alinement with the point about which measurements are to be made.

The nature and characteristic features of the present invention will be more readily understood from the following description, taken in connection with the accompanying drawings forming part hereof, in which:

Fig. 2 is an exploded view of the device of the present invention with the several parts thereof shown in separated relationship;

Fig. 3 is a top or plan view of the device, detached from the surveying instrument in connection with which it is intended to be used;

Fig. 4 is a vertical section of the device taken on the line 4—4 of Fig. 3; and

Fig. 5 is a similar view, the section being taken transversely, that is, on the line 5—5 of Fig. 3.

Figure 1:
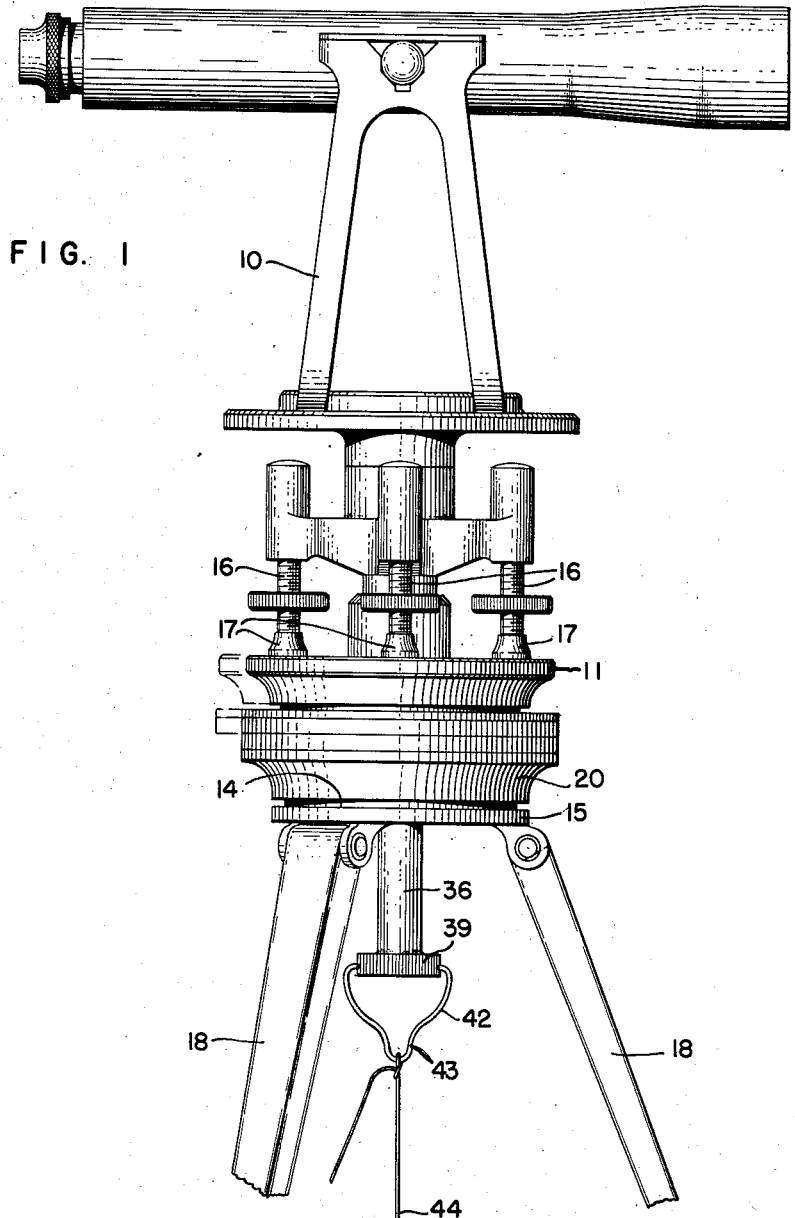
Figure 1 is a side elevation of a surveying instrument of an ordinary type, certain of the parts which are not germane to the present invention being omitted, and the same being shown mounted on a tripod head with an attachment embodying the main features of the present invention interposed between the instrument base and the tripod head.

It should, of course, be understood that the description and drawings are illustrative merely, and that various modifications and changes may be made in the structure disclosed without departing from the spirit of the invention.

Referring now more particularly to Fig. 1 of the drawings, there is therein shown an instrument of the transit type, certain of the parts being omitted for the purpose of clarity of illustration, particularly, such parts as are not pertinent to the present invention.

Referring to the drawings, 10 is the instrument proper which is provided with a base plate 11, on the under part of which there is the usual aperture internally threaded for mounting the same on the complementally threaded portion 14 of the top plate 15 of the tripod.

The instrument 10 is provided with the usual leveling screws 16, the lower faces of the heads 17 of which bear against the top surface of the base plate 11 of the instrument. The leveling screws 16 are operated in the usual manner by the simultaneous rotation of oppositely disposed screws 16 in a common vertical plane.

The tripod head 15 has hingedly secured thereto the ordinary and usual leg members 18 which may be of any preferred type of construction.

Referring now more particularly to sheet 2 of the drawings, a preferred construction and arrangement of the device of the present invention is shown therein, which comprises a plurality of members some of which are adjustable with relation to others in a manner and for a purpose to be presently explained.

The device as there shown consists of a member 20 which is similar in many respects to the base plate of the instrument proper, the same having an integral top plate 21 with an upper horizontal bearing surface 22. In the under part of member 20 there is provided a recess 23 having an internal thread 24 complemental to the thread on the projecting portion 14 of the head 15 of the tripod, so that when the instrument proper is removed from the tripod head 15 the device of the present invention may be mounted on the said tripod head in a similar manner.

The top plate portion 21 of the member 20 is provided with diametral slots 26 through which extend screws 27 having intermediate shoulder portions of a diameter equal to the width of the slots 26. The ends of the screws 27 are threaded into a plate member 28, superposed over the plate portion 21 of the member 20.

The plate member 28 is also provided with diametral slots 29 disposed in a plane at right angles to the plane in which the slots 26 of the plate portion 21 of the member 20 are disposed. Screws 30 extend through the slots 29, and these screws also have intermediate shoulder portions of a diameter equal to the width of the slots 29. The ends of the screws 30 are in turn threaded into a plate member 31. Here again the slot and screw connection will permit movement of the plate member 31 in a direction at right angles to the movement of the plate member 28. The components of such movements are such that plate member 31 may be slid horizontally to any desired location within permissible limits.

A flanged member 32 is secured by screws 33 to the plate member 31, and such flanged member is provided with a short sleeve-like portion 34 having external threads 35 of the same kind and size as those on the tripod head, and complemental to the threads in the recess on the under portion of the base member of the instrument proper which heretofore have been used for mounting the instrument proper on the tripod head.

A tubular member 36 may be threaded into the plate member 31, said tubular member extending downwardly in alinement with the central perpendicular axis of the plate member 31. Said tubular member 36 is provided with an annular shoulder 37, which bears against a washer 38, serving, when the tubular member 36 is rotated, to clamp the main plate members of the device to each other in their adjusted positions. The lower end of the tubular member 36 may be provided with a knurled flange portion 39 to facilitate the clamping action.

The tubular member 36 may be provided, as shown in Fig. 4 of the drawings, with a peep hole 40 at the upper end thereof, and a transparent inset 41 at the lower end thereof having crossed hair lines thereon (not shown), whereby in the preliminary setting of the tripod and before the instrument is placed on the device of the present invention, a reasonably close approximation of the proper setting of the instrument over the point with respect to which measurements are to be taken may be effected.

On the other hand, if desired, a wire bail member 42 may be pivotally mounted on the knurled portion of the tubular member 36, being provided at its lower end with a U-shaped portion 43 adapted to be engaged by the cord or chain 44 of a plumb bob assembly.

The operation of the device of the present invention will now be readily understood.

When the instrument is about to be set over a point about which measurements are to be taken, the tripod is first set up with its head as nearly approximately level as can be estimated with its central vertical axis over the measuring point.

The device of the present invention is then mounted on the tripod head by means of the threaded portion 20, being more accurately located horizontally by sighting through the vertical tube 36, or by means of the plumb line. The several plates of the device have their bearing faces parallel and said plates may be shifted horizontally relatively to each other to bring the vertical central axis over the point about which the measurements are to be taken, after which the several plates are clamped to each other by the tightening of the tubular member 36.

The instrument proper may now be placed on the device of the present invention by threading the same on the flanged member 32, after which the instrument may be leveled in the usual and customary manner, and any final adjustment which may be necessary in order to bring the central vertical axis of the instrument proper accurately over the point about which the measurements are to be taken, may be accomplished by loosening the tubular member 36, and if the instrument proper be shifted to bring the same to the final position over the measuring point, this may be done without the necessity of readjusting the leveling screws of the instrument when the horizontal adjustment has been accomplished.

We claim:

1. A device for use in connection with surveying instruments and adapted to be positioned between the base plate of the instrument proper and the head member of the tripod to facilitate the sidewise adjustment of the instrument thereon, said device comprising a plurality of superposed plates the abutting bearing faces of which are flat and disposed in horizontal parallel planes, means on the upper plate for securing the base plate of the instrument thereto, means on the lower plate for securing same to the head member of the tripod, means for constraining horizontal movement of one of said plates in a direction at right angles to horizontal movement of another of said plates, and means for clamping said plates to each other in adjusted relationship, said clamping means including a member extending vertically downward from and in the central axis of the upper plate which has the means for securing the baseplate of the instrument thereto.

2. A device for use in connection with surveying instruments and adapted to be positioned between the base plate of the instrument proper and the head member of the tripod to facilitate the sidewise adjustment of the instrument thereon, said device comprising a plurality of superposed plates the bearing faces of which are disposed in parallel planes, means on the uppermost plate for securing the base plate of the instrument thereto, means on the lowermost plate for securing same to the head member of the tripod, one of said plates having radially disposed slots, members extending through said slots and secured in an adjacent plate, another plate having radially disposed slots disposed in a plane at right angles to the plane of the first mentioned slots, members extending through said last mentioned slots and mounted in an adjacent plate, and means for clamping said plates to each other in adjusted relationship, said clamping means including a member extending vertically downward from and in the central axis of the upper plate which has the means for securing the baseplate of the instrument thereto.

3. A device for use in connection with surveying instruments and adapted to be positioned between the base plate of the instrument proper and the head member of the tripod to facilitate the sidewise adjustment of the instrument thereon, said device comprising a plurality of superposed plates the bearing faces of which are disposed in parallel planes, means on the uppermost plate for securing the base plate of the instrument thereto, means on the lowermost plate for securing same to the head member of the tripod, one of said plates having radially disposed slots, members extending through said slots and secured in an adjacent plate, another plate having radially disposed slots disposed in a plane at right angles to the plane of the first mentioned slots, members extending through said last mentioned slots and mounted in an adjacent plate, and means for clamping said plates to each other in adjusted relationship, said means including a washer engaging the lowermost plate, and a central member threaded in the uppermost plate on the vertical axis of the instrument and having an annular shoulder engaging said washer.

4. A device for use in connection with surveying instruments and adapted to be positioned between the base plate of the instrument proper and the head member of the tripod to facilitate the sidewise adjustment of the instrument thereon, said device comprising a plurality of superposed plates the bearing faces of which are disposed in parallel planes, means on the uppermost plate for securing the base plate of the instrument thereto, means on the lowermost plate for securing same to the head member of the tripod, one of said plates having radially disposed slots, members extending through said slots and secured in an adjacent plate, another plate having radially disposed slots disposed in a plane at right angles to the plane of the first mentioned slots, members extending through said last mentioned slots and mounted in an adjacent plate, and means for clamping said plates to each other in adjusted relationship, said means including a washer engaging the lowermost plate, and a central tubular member threaded in the uppermost plate on the vertical axis of the instrument and having an annular shoulder engaging said washer, said tubular member having sighting means for vertical alinement relative to a point about which measurements are to be taken.

5. A device for use in connection with surveying instruments and adapted to be positioned between the base plate of the instrument proper and the head member of the tripod to facilitate the sidewise adjustment of the instrument thereon, said device comprising a plurality of superposed plates the bearing faces of which are disposed in parallel planes, means on the uppermost plate for securing the base plate of the instrument thereto, means on the lowermost plate for securing same to the head member of the tripod, one of said plates having radially disposed slots, members extending through said slots and secured in an adjacent plate, another plate having radially disposed slots disposed in a plane at right angles to the plane of the first mentioned slots, members extending through said last mentioned slots and mounted in an adjacent plate, and means for clamping said plates to each other in adjusted relationship, said means including a washer engaging the lowermost plate, and central tubular member threaded in the uppermost plate on the vertical axis of the instrument and having an annular shoulder engaging said washer, said tubular member having sighting means for vertical alinement relative to a point about which measurements are to be taken, and said tubular member also having means for securing a plumb line thereto.

References Cited in the file of this patent

UNITED STATES PATENTS

| | | |
|---|---|---|
| 918,817 | Berger | Apr. 20, 1909 |
| 928,477 | Sloggett | July 20, 1909 |
| 943,063 | Cooke | Dec. 14, 1909 |
| 1,434,209 | Hort | Oct. 31, 1922 |
| 2,702,944 | Lane et al. | Mar. 1, 1955 |
| 2,766,530 | Tishler | Oct. 16, 1956 |

FOREIGN PATENTS

| | | |
|---|---|---|
| 632,261 | France | Oct. 1, 1927 |
| 110,814 | Austria | Oct. 10, 1928 |